United States Patent [19]

Steer

[11] Patent Number: 4,489,224
[45] Date of Patent: Dec. 18, 1984

[54] FLUID LEVEL INDICATOR
[75] Inventor: John E. Steer, South Bend, Ind.
[73] Assignee: The Bendix Corporation, Southfield, Mich.
[21] Appl. No.: 481,516
[22] Filed: Apr. 1, 1983
[51] Int. Cl.³ .............................................. H01H 35/18
[52] U.S. Cl. ................................................... 200/84 C
[58] Field of Search ............. 200/81.9 M, 84 R, 84 C; 73/305, 308, 317; 340/623, 625

[56] References Cited
U.S. PATENT DOCUMENTS

| 2,927,176 | 3/1960 | Auld, Jr. et al. | 200/84 C |
| 3,868,485 | 2/1975 | Sykes et al. | 200/84 C X |
| 4,085,336 | 4/1978 | Miles | 200/81.9 M X |

FOREIGN PATENT DOCUMENTS

| 1518966 | 3/1968 | France | 200/84 C |
| 420882 | 8/1974 | U.S.S.R. | 73/317 |

Primary Examiner—J. R. Scott
Attorney, Agent, or Firm—Paul David Schoenle; Ken C. Decker

[57] ABSTRACT

A fluid level indicator is provided for a master cylinder to generate a signal in response to the fluid level reaching a predetermined level. The fluid level indicator includes a carrier assembly for holding a magnet and moving the same within a master cylinder reservoir. A reed switch is activated by the magnet in a given position.

10 Claims, 4 Drawing Figures

FLUID LEVEL INDICATOR

BACKGROUND OF THE INVENTION

This invention relates to a fluid level indicator for a reservoir wherein a signal is generated when the fluid level reaches a predetermined minimum level. More particularly, the invention covers a reservoir wherein a magnet is movable in response to the fluid level to actuate a reed switch.

A master cylinder in a vehicle brake system is provided with a reservoir to carry brake fluid. Throughout the life of the brake system increasing amounts of brake fluid are communicated from the reservoir to the master cylinder to accommodate lining wear and the associated piston adjustment. If the fluid level approaches a minimum level, it is desirable to provide a warning for a vehicle operator so that brake fluid can be added to the reservoir and the brake system checked for leaks or excessive friction lining wear.

Various fluid level indicators have been provided. Examples of these indicators can be found in U.S. Pat. Nos. 4,057,700 (Nakashima), 4,046,977 (Cadeddu), and 3,678,490 (Putt). In all of these examples, the indicators take up the entire height of the reservoir as a magnet is moved adjacent a reed switch to actuate a warning circuit. Where a float is provided, the float material is a plastic "foam", such as a porous resin or a two-part assembly requiring attachment before use with the master cylinder reservoir.

The present invention provides a fluid level indicator for a reservoir containing fluid, the indicator including a magnet which cooperates with a reed switch or the like to generate a signal when the fluid level in the reservoir is below a predetermined level and a carrier assembly engageable with the magnet to control movement of the latter, characterized in that said carrier assembly comprises a first part supporting said magnet thereto and a second part movable in response to the level of fluid in the reservoir to move said magnet from a rest position to an actuated position, said second part defining a weight which is greater than a weight for said first part and said magnet when said carrier assembly is out of the fluid, said first part and said magnet combined weight being greater than said second part weight when said carrier assembly is in the fluid, and said carrier assembly comprising a solid plastic-like material having a density which is less dense than the density of said magnet whereby said second part will move said first part as the fluid level approaches or reaches the predetermined setting.

It is an advantage of the present invention that the carrier assembly can be molded as a solid from a variety of plastic-like materials, thereby decreasing production time. It is also an advantage that the carrier assembly is disposed adjacent a base for the reservoir at all times to define a low profile for compact disposition within the reservoir.

BRIEF DESCRIPTION OF THE DRAWINGS

The invention will now be described with reference to the accompanying drawings, which illustrate one embodiment of the invention, wherein.

BRIEF DESCRIPTION OF THE PREFERRED EMBODIMENTS

Figure 1:
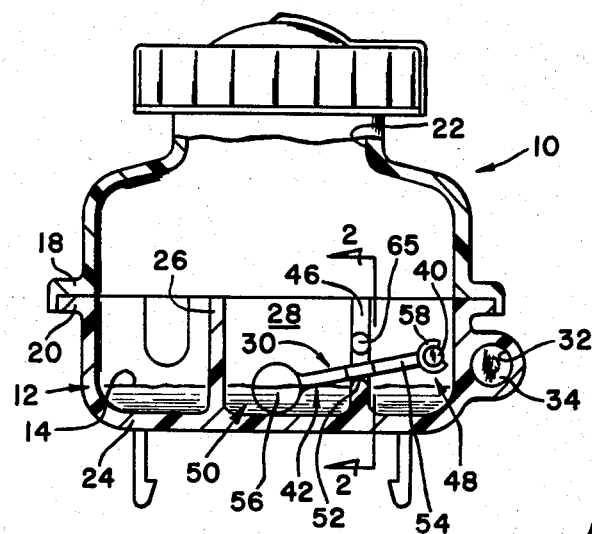
FIG. 1 is cross-sectional view of a reservoir.
Figure 2:
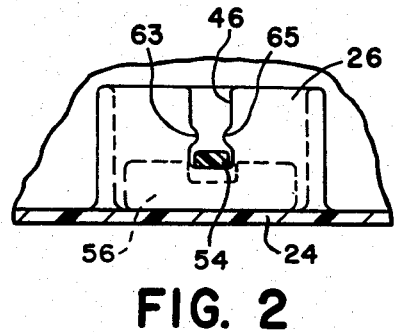
FIG. 2 is a view taken along line 2—2 of FIG. 1.
Figure 3:
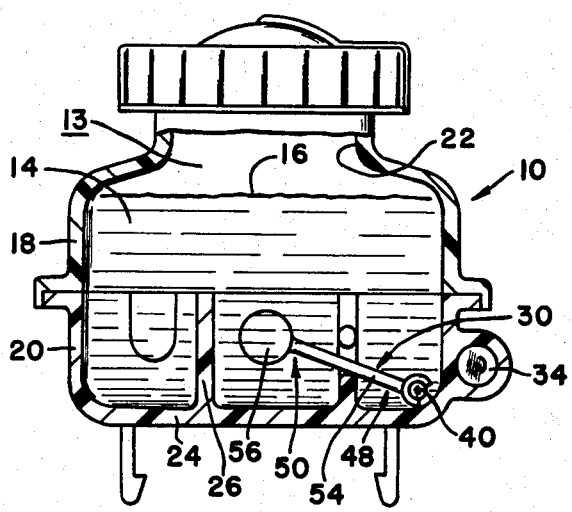
FIG. 3 is a view similar to FIG. 1 with a full level of fluid.

A master cylinder reservoir 10 comprising a housing 12 is utilized to carry brake fluid 14 in the chamber 13 completely filling the reservoir 10 at the full level indicated at 16. The housing 12 is made by joining a top half 18 with a bottom half 20. The top half includes an opening 22 for filling the reservoir with brake fluid while the bottom half includes openings (not shown) extending from a base 24 to communicate brake fluid to a master cylinder or the like in a vehicle brake system. The bottom half includes an integrally formed wall 26 forming a central cavity 28 for receiving a part of the indicator 30. The bottom half also defines a chamber 32 outside the fluid chamber 13 and a reed switch 34 is carried in the chamber 32 near the base 24.

In accordance with the invention, the indicator 30 comprises a magnet 40 and a carrier assembly 42. The carrier assembly 42 is preferably made of solid polypropylene with a density slightly greater than the density of the brake fluid and less than the density of the magnet. The wall 26 is formed with a slot 46 so that a first part 48 of the indicator extends outwardly of the cavity 28 in the direction of the reed switch 34. A second part 50 of the indicator 30 is disposed in the cavity so that a pivot on the carrier assembly 42 separates part 48 from part 50 and pivotally engages the bottom edge 52 of slot 46.

Figure 4:
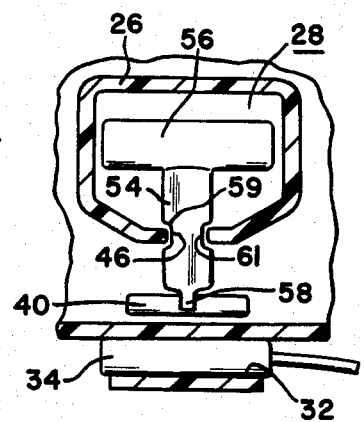
FIG. 4 is a top view of FIG. 1.

The carrier assembly 42 is formed in substantially T-shaped configuration, see FIG. 4, with a leg 54 extending from the middle of a cross member 56. The leg 54 terminates in a snap-fit 58 arrangement with the magnet 40 to carry the latter adjacent the chamber 32. A pair of recesses 59 and 61 on the leg receive the wall 26. Projections 63 and 65 oppose removal of the leg from the slot 46. The cross member 56 is cylindrical in configuration so that when the cross member 56 engages the base 24, the leg 54 disposes the magnet 40 directly opposite the reed switch 34.

When the carrier assembly 42 and magnet 40 are disposed outside of the brake fluid, the weight of the first part 48 is less than the weight of the second part 50 so that on a horizontal reference, the magnet will pivot upwardly until the second part 50 is engaged with the base 24. When the carrier assembly and magnet 40 are disposed inside the brake fluid, the effective weight of the first part is greater than the effective weight of the second part so that the magnet will pivot downwardly to engage the first part with the base 24 while the second part will be pivoted upwardly spaced from the base. As a result, it is seen that when the reservoir is filled with brake fluid, the magnet will be spaced downwardly from the reed switch to render the latter unactuated. As the fluid is drained from the reservoir, there is a predetermined minimum fluid level at which the weight of the second part outside the fluid will overcome the weight of the first part in the fluid to move the magnet upwardly opposite the reed switch and cause the latter to actuate a warning circuit associated therewith.

In view of the foregoing description, it is seen that indicator 30 forms a low profile within the reservoir chamber 13 to avoid interfering with the opening 22 or the top half 18. In addition, the carrier assembly and magnet remain substantially stationary near the base until the fluid level is at or near the predetermined minimum level. Consequently, the reservoir need not accommodate a float-like part which moves with the level of fluid from a full position to the minimum level. In addition, a conventional float-like part displaces considerable reservoir fluid volume while requiring considerable reservoir capacity and the minimum fluid level for actuating the reed switch is limited. In contrast, the invention herein provides a lower minimum level than previously available because the carrier assembly described herein does not require buoyant-like characteristics and displaces less fluid volume.

I claim:

1. A fluid level indicator for a reservoir containing fluid, the indicator including a magnet which cooperates with a reed switch or the like to generate a signal when the fluid level in the reservoir is below a predetermined level and a carrier assembly engageable with the magnet to control movement of the latter, characterized in that said carrier assembly comprises a first part supporting said magnet thereto and a second part movable in response to the level of fluid in the reservoir to move said magnet from a rest position to an actuated position, said second part defining a weight which is greater than a weight for said first part and said magnet when said carrier assembly is out of the fluid, said first part and said magnet combined weight being greater than said second part weight when said carrier assembly is in the fluid, said carrier assembly comprising a solid plastic-like material having a density which is less dense than the density of said magnet whereby said second part will move said first part as the fluid level approaches or reaches the predetermined level, and said carrier assembly density is equal to or slightly greater than the density of the fluid in said reservoir, whereby said carrier assembly and said magnet remain freely immersed in the fluid when the level of the latter is at or near the top of the reservoir.

2. The indicator of claim 1 in which said reservoir includes a housing with a base, said first part being adjacent said base when said magnet is in the rest position and said second part being adjacent said base when said magnet is in the actuated position.

3. The indicator of claim 1 in which said reservoir includes a housing with a base and an upwardly extending wall from said base defines a cavity for receiving said second part, said first part being disposed outside said cavity.

4. The indicator of claim 3 in which said wall defines a slot with a bottom edge and said carrier assembly pivots about said bottom edge in response to varying levels of fluid in the reservoir.

5. The indicator of claim 4 in which said slot is provided with projections to define a snap-fit for said carrier assembly in said slot.

6. The indicator of claim 1 in which said carrier assembly is substantially T-shaped in a horizontal plane with a leg extending from one side of a cross member, and said leg terminates in a snap-fit for said magnet.

7. The indicator of claim 6 in which said cross member is substantially engageable with a base of said reservoir when said magnet is in the actuated position.

8. A fluid level indicator for a reservoir wherein a fluid is communicated outwardly of the reservoir to lower the level from a full position to a low position, the fluid reaching the low position to actuate a reed switch or the like attached to the reservoir, characterized in that said indicator comprises a carrier assembly and a magnet which are completely immersed in the fluid when the latter is at the full position, said carrier assembly is responsive to the fluid in the reservoir approaching the low position to move said magnet adjacent said reed switch whereby the latter is actuated, and said carrier assembly is operable in the absence of a float or the like where the float density is less than a density for said fluid.

9. The indicator of claim 8 in which said carrier assembly defines a density less than a density for said magnet and greater than a density for said fluid.

10. A fluid level indicator for a reservoir wherein a signal is generated when the fluid level approaches a predetermined minimum level relative to a base of the reservoir, the indicator including a reed switch or the like attached to the reservoir, a magnet movably carried within the reservoir and means for moving the magnet in response to the level of fluid in the reservoir, characterized in that said moving means and said magnet are disposed adjacent the base of the reservoir while the level of fluid is lowered from a full position toward the predetermined minimum level, said moving means and said magnet defining a low profile within the reservoir and remaining substantially stationary in the reservoir in a freely immersed state until the fluid level approaches the predetermined minimum level.

* * * * *